United States Patent
Hafermalz et al.

(10) Patent No.: US 9,534,630 B2
(45) Date of Patent: Jan. 3, 2017

(54) STEERING GEAR

(71) Applicant: ZF LENKSYSTEME GMBH, Schwäbisch Gmünd (DE)

(72) Inventors: Jens Hafermalz, Waeschenbeuren (DE); Dennis Fuechsel, Schwaebisch Gmuend (DE)

(73) Assignee: Robert Bosch Automotive Steering GmbH, Schwaebisch Gmuend (DE)

( * ) Notice: Subject to any disclaimer, the term of this patent is extended or adjusted under 35 U.S.C. 154(b) by 0 days.

(21) Appl. No.: 14/782,367

(22) PCT Filed: Apr. 2, 2014

(86) PCT No.: PCT/EP2014/056575
§ 371 (c)(1),
(2) Date: Oct. 5, 2015

(87) PCT Pub. No.: WO2014/177338
PCT Pub. Date: Nov. 6, 2014

(65) Prior Publication Data
US 2016/0097424 A1    Apr. 7, 2016

(30) Foreign Application Priority Data
May 3, 2013    (DE) .......................... 10 2013 104 521

(51) Int. Cl.
*F16H 1/16*        (2006.01)
*F16C 27/04*       (2006.01)
(Continued)

(52) U.S. Cl.
CPC ............. *F16C 27/04* (2013.01); *B62D 5/0409* (2013.01); *F16H 57/039* (2013.01); *F16C 19/06* (2013.01);
(Continued)

(58) Field of Classification Search
CPC ...... F16C 27/04; B62D 5/0409; F16H 57/089; F16H 25/24; F16H 2057/0213; F16H 2057/0222
See application file for complete search history.

(56) References Cited

U.S. PATENT DOCUMENTS 6,470,766 B2 * 10/2002 Ohta .......................... E01H 5/04
74/411
8,549,945 B2 * 10/2013 Rho ..................... B62D 5/0409
384/256
(Continued)

FOREIGN PATENT DOCUMENTS

DE    10 2008 040 673    1/2010
DE    10 2012 103 146    10/2013
(Continued)

*Primary Examiner* — William Kelleher
*Assistant Examiner* — Zakaria Elahmadi
(74) *Attorney, Agent, or Firm* — Jordan and Koda, PLLC

(57) ABSTRACT

A fixed bearing for a steering gear having a rotary bearing which comprises an inner bearing shell which is provided for receiving a pinion shaft of the steering gear, and an outer bearing shell which is accommodated in a bearing bushing, and having a pivoting ring which has an outer ring and an inner ring which are pivotably connected via one or more torsion webs, wherein the outer ring is provided for supporting the fixed bearing in a housing of the steering gear, wherein the inner ring of the pivoting ring is mounted and axially secured on the outside of the bearing bushing.

13 Claims, 3 Drawing Sheets

(51) Int. Cl.
    *B62D 5/04*         (2006.01)
    *F16H 57/039*      (2012.01)
    *F16H 57/021*      (2012.01)
    *F16H 25/24*        (2006.01)
    *F16H 57/022*      (2012.01)
    *F16H 57/12*        (2006.01)
    *F16C 19/06*        (2006.01)
    *F16C 19/54*        (2006.01)

(52) U.S. Cl.
    CPC ............... *F16C 19/54* (2013.01); *F16H 25/24* (2013.01); *F16H 2057/0213* (2013.01); *F16H 2057/0222* (2013.01); *F16H 2057/127* (2013.01)

(56) References Cited

U.S. PATENT DOCUMENTS

| | | | |
|---|---|---|---|
| 8,667,858 B2 | 3/2014 | Fuechsel et al. | |
| 2005/0161277 A1* | 7/2005 | Bock | B62D 5/0409 180/400 |
| 2006/0117889 A1* | 6/2006 | Segawa | B62D 5/0409 74/425 |
| 2007/0163374 A1* | 7/2007 | Yamazaki | B62D 5/0409 74/409 |
| 2012/0067151 A1* | 3/2012 | Kikuchi | F16H 55/06 74/425 |
| 2012/0272765 A1* | 11/2012 | Fuechsel | B62D 5/0409 74/416 |
| 2013/0239726 A1* | 9/2013 | Fuechsel | F16H 57/039 74/425 |
| 2014/0029884 A1* | 1/2014 | Toyama | B62D 5/0409 384/490 |
| 2014/0083794 A1* | 3/2014 | Ishii | B62D 5/0409 180/444 |
| 2015/0040699 A1 | 2/2015 | Hafermalz et al. | |
| 2016/0097424 A1* | 4/2016 | Hafermalz | F16H 57/039 74/425 |

FOREIGN PATENT DOCUMENTS

| | | |
|---|---|---|
| EP | 0 630 800 | 12/1994 |
| WO | WO-2011/073089 | 6/2011 |

* cited by examiner

STEERING GEAR

BACKGROUND OF THE INVENTION

The invention relates to a steering gear for a power-assisted steering system of a motor vehicle, and in particular a fixed bearing for such a steering gear.

In most motor vehicles, power-assisted steering systems are installed which generate a supporting torque during steering and as a result reduce the steering torque which has to be applied to the steering column by the driver.

The known power-assisted steering systems are based on a steering gear which converts the driving power of a hydraulic or electric drive and transmits it to the steering column. Such steering gears are generally embodied in the form of a screw rolling gear, and in particular as a helical gear or worm gear, i.e. the latter comprise a gear wheel which is connected directly or indirectly to the steering rod, and a pinion which meshes therewith and is driven by the drive via a pinion shaft.

Gearing play which is formed owing to component tolerances, different widths of thermal expansion of the gear elements and owing to wear has proven problematic in such steering gears. In particular, in the case of what is referred to as alternating steering, that is to say, in the case of directly successive steering with alternating steering lock, such gearing play generates undesired noises which result from alternating abutment to opposite flanks of the teeth of pinion and gear wheel.

It is known for said gearing play to be eliminated by virtue of the pinion shaft being mounted so as to be pivotable about an axis running perpendicular to the longitudinal axis of the pinion shaft and at a distance to the toothing engagement of the pinion and gear wheel, and being pressed against the gear wheel by means of one or more spring elements. Here, the pivoting capability of the pinion shaft is integrated into one of the two bearing arrangements over which the pinion shaft is mounted at its ends. This bearing arrangement is referred to as "fixed bearing". The bearing arrangement in the region of the other end is then implemented with play (so-called "floating bearing") in order to permit the deflection caused by the pivoting movement. The fixed bearing is generally provided at the drive side, while the floating bearing is provided at the free end of the pinion shaft. The spring element or elements for pressing the pinion against the gear wheel are generally integrated into the floating bearing.

Such a steering gear is known, for example, from WO 2011/073039 A1. In said document there is a provision for the roller bearing which receives the pinion shaft in the region of the fixed bearing to be mounted on the outside in a pivoting bushing. The pivoting bushing comprises a bearing bushing which receives the roller bearing largely free of play, and an outer ring which is secured largely free of play in a drilled hole in a housing of the steering gear, wherein the outer ring and the bearing bushing are connected via a plurality of webs which are twisted during rotation of the outer ring with respect to the bearing bushing. The entire pivoting bushing is constructed in one piece in the form of a sheet-metal component.

A configuration of a steering gear which is similar to WO 2011/073039 A1 is described in the German patent application 10 2012 103 146.0 which has not been published to date. In said document, the pivoting ring is, however, embodied as a separate component. In this concept, the pivoting ring comprises an inner ring and an outer ring which is connected to the inner ring via two torsion webs. The outer ring serves to support the fixed bearing in the housing of the steering gear, while the inner ring is clamped between the roller bearing and a radially inwardly bent-over end of the bearing bushing. In order to be able to introduce the inner ring of the pivoting ring into the bearing bushing, the bearing bushing is provided at the corresponding longitudinal end with two longitudinal slots which serve to receive the torsion webs.

A disadvantage with this fixed bearing is the relatively complex manufacture (owing to the longitudinal slots which have to be put in place) and the relatively complicated mounting (owing to the necessary precise orientation of the bearing bushing relative to the pivoting ring). In addition, the bearing bushing is structurally weakened by the longitudinal slots, which can lead to undesired mobility of the roller bearing and therefore of the bearing arrangement of the pinion shaft.

SUMMARY OF THE INVENTION

Taking this prior art as a starting point, the invention has been based on the object of specifying an improved steering gear for a power-assisted steering system of a motor vehicle. In particular, a steering gear is to be specified which is easy to manufacture and/or mount.

This object is achieved by means of a steering gear according to patent claim 8 having a fixed bearing according to patent claim 1. Advantageous embodiments of the fixed bearing according to the invention are the subject matter of the dependant patent claims and can be found in the following description of the invention.

The invention is based on the concept of avoiding the disadvantages which arise from the receiving of the inner ring of the pivoting ring within the bearing bushing in the case of the fixed bearing which is described in the German patent application 10 2012 103 146.0, by virtue of the fact that the inner ring is mounted on the outside of the bearing bushing. As a result, the bearing bushing can have a simple and, in particular, non-slotted tubular shape which is not only cost-effective to manufacture but also requires no particular orientation during mounting. However, in order to mount the pinion shaft in the fixed bearing with as little play as possible, this inventive solution requires the movement of the pinion shaft to be transmitted with as little play as possible from said pinion shaft to the rotary bearing and then to the pivoting ring via the bearing bushing. According to the invention, this is achieved by means of a suitable, axially non-movable bearing arrangement of the rotary bearing in the bearing bushing, and of the pivoting ring on the bearing bushing.

Accordingly an inventive fixed bearing for a steering gear, having a rotary bearing (in particular roller bearing) which has an inner bearing shell which is provided for receiving a pinion shaft of the steering gear, and an outer bearing shell which is accommodated in a bearing bushing, and having a pivoting ring which has an outer ring and an inner ring which are pivotably (elastically) connected via one or more torsion webs, wherein the outer ring is provided for supporting the fixed bearing in a housing of she steering gear, is developed according to the invention in that the inner ring of the pivoting ring is mounted and axially secured on the outside of the bearing ring.

In one preferred refinement of the fixed bearing according to the invention there can be provision that the bearing bushing has a first longitudinal section and a second longitudinal section, wherein the second longitudinal section has a smaller outer diameter and inner diameter than the first longitudinal section, with the result that a stop is formed both on the outside and on the inside between the first and second longitudinal sections, wherein the rotary bearing bears on the inner stop, and the pivoting ring bears on the outer stop.

This constitutes a structurally particularly simple integration of two (longitudinal) stops for the rotary bearing and the pivoting ring. Such a bearing bushing can be particularly preferably generated by shaping from a tubular semi-finished product, wherein there should preferably be provision that the bearing bushing is embodied with a wall thickness as constant as possible. Furthermore, the radially running section of the bushing walls, which section forms the stops, should be oriented as perpendicular as possible with respect to the longitudinal axis of the bearing bushing.

In addition to shaping from, a tubular semi-finished product, there is also the possibility of forming the stops by metal-cutting processing (in particular turning) of a tubular or rod-shaped semi-finished product. Basically, there is also the possibility of forming the stops by means of separate components, for example stop rings, which engage in an inner groove or outer groove of the bearing bushing or are connected to the bearing bushing in some other way (for example welded, soldered, bonded).

In one preferred refinement of the fixed bearing according to the invention there can be provision that a free end of the bearing bushing, in particular the first longitudinal section, is shaped radially inward in order to form an inner collar which forms a (second) (longitudinal) stop for the rotary bearing. This constitutes a structurally simple implementation of a means for securing the rotary bearing on both sides in a longitudinally axial fashion. The complete longitudinally axial securing would therefore take place through a shaping step after the introduction of the rotary bearing into the bearing bushing. There is also the alternative possibility of forming the end-stop by means of a separate stop element, for example a stop ring.

In a corresponding way there can advantageously also be provision that the free end of the bearing bushing, in particular the second longitudinal section, which is adjacent to the pivoting ring, is shaped radially outward in order to form an outer collar which forms a (second) (longitudinal) stop for the pivoting ring.

In order to bring about the most uniform possible transmission or axial forces between the pivoting ring and the shaped bearing bushing there can advantageously be provision of an annular washer which is arranged between the pivoting ring and the outer collar.

Since the pivoting ring can be used to define the pivoting axis for the pinion shaft, rotation of the pivoting ring after mounting of the fixed bearing in the steering gear should no longer be possible. To this purpose, anti-rotation means for the pivoting ring should be implemented. This can advantageously be achieved with the preferred shaping in order to form an outer collar by virtue of the fact that the spring ring and/or the annular washer have (at least) one projection and/or (at least) one depression which form a positively locking anti-rotation means with the outer collar in that during the shaping process material of the bearing bushing is forced into the depression, or the projection is forced into the outer collar of the bearing bushing, as a result of which a positively locking connection is implemented.

A steering gear according to the invention comprises at least one gear wheel, a pinion which meshes with the gear wheel and a pinion shaft which comprises the pinion, wherein the pinion shaft is mounted on the one side of the pinion in a fixed bearing according to the invention, which forms a pivoting axis for the pinion shaft which is located transversely with respect to the longitudinal axis of the pinion shaft, and wherein the pinion shaft is preferably mounted in a floating bearing on the other side of the pinion.

The invention will be explained in more detail in the following, on the basis of an exemplary embodiment which is illustrated in the drawings.

DESCRIPTION OF THE PERSPECTIVE EMBODIMENTS

Figure 1:
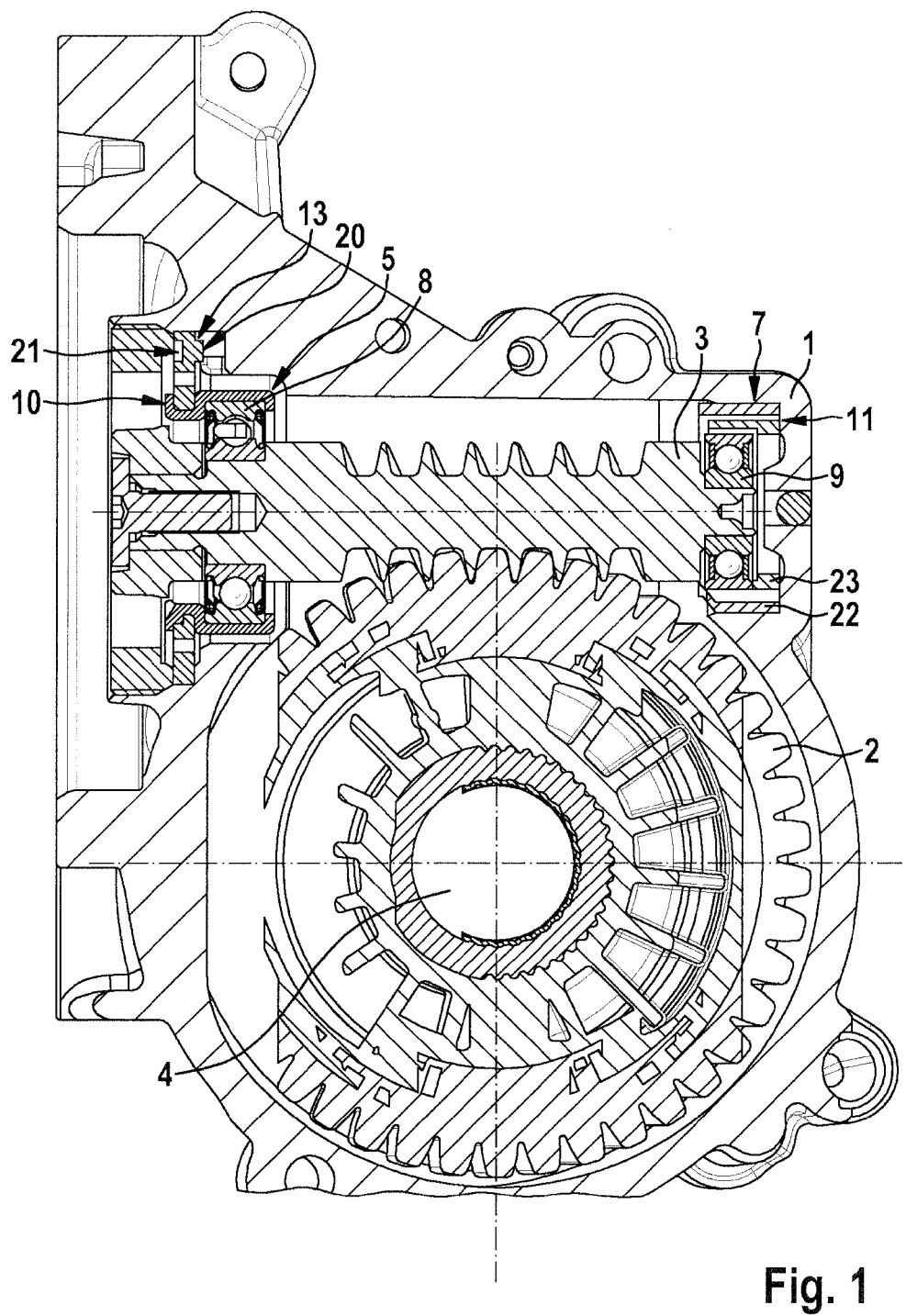
FIG. 1 shows a steering gear according to the invention in a longitudinal section.
Figure 2:
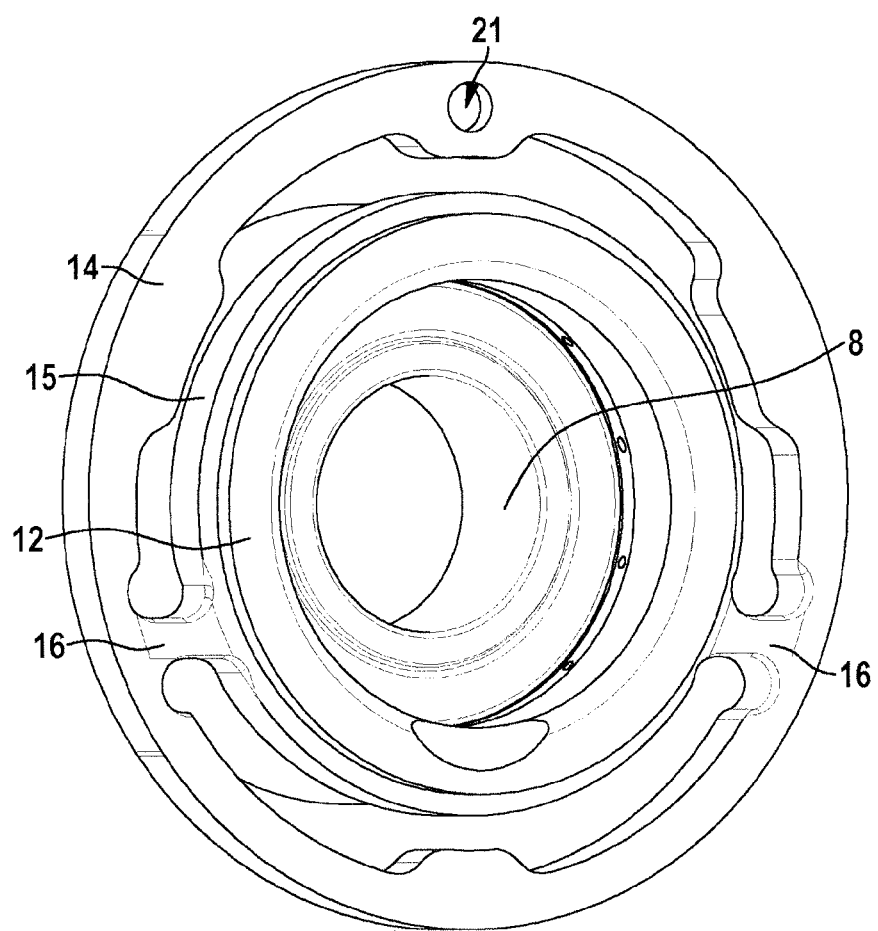
FIG. 2 shows the fixed bearing of the steering gear in a perspective view.

FIG. 1 shows the essential components of an embodiment of a steering gear according to the invention. The latter comprises a housing 1, within which a gear wheel 2 and a pinion which meshes with the gear wheel 2 are mounted. The pinion and a pinion shaft 3 which comprises the pinion are constructed integrally in the form of a worm.

The gear wheel 2 is fixedly attached to a steering column 4 or to an output shaft of the steering gear of a motor vehicle.

The pinion shaft 3 has a drive-side end by means of which it is able to be connected to the output shaft of a drive (for example an electric motor) which is not shown. In the region of this drive-side end, the pinion shaft 3 is mounted in the housing 1 by means of a first bearing arrangement. This bearing arrangement is embodied as a fixed bearing 5 which essentially permits no translation of the pinion shaft 3 relative to the housing 1, but does permit pivoting about a pivoting axis 6.

This pivoting causes the free end of the pinion shaft 3 which is opposite the drive-side end to be deflected outward, said free end of the pinion shaft 3 being mounted there by means of a floating bearing 7 in a corresponding receptacle in the housing 1. This floating bearing 7 is embodied in such a way that it permits the outward deflection of the free end which results from the pivoting of the pinion shaft 3.

Both the fixed bearing 5 and the floating bearing 7 each comprise a rotary bearing in the form of a (ball) roller bearing 8, 9. The corresponding sections of the pinion shaft 3 are mounted largely free of play in inner bearing shells of the roller bearings 8, 9, while outer bearing shells of the roller bearings 8, 9 are respectively each mounted in a bearing device 10, 11, which bearing devices 10, 11 are in turn arranged largely free of play in corresponding receptacles of the housing 1. The bearing devices 10, 11 are structurally embodied in such a way that in the case of the fixed bearing 5 they permit the pivoting of the pinion shaft 3 about the pivoting axis 6, and in the case of the floating bearing 7 they permit the outward deflection of the free end of the pinion shaft 3.

For this purpose, the bearing device 10 of the fixed bearing 5 comprises a bearing bushing 12 with a circular cross section which accommodates the roller bearing 8 on the inside in a first longitudinal section, and a pivoting ring 13 on the outside in a second longitudinal section.

Figure 3:
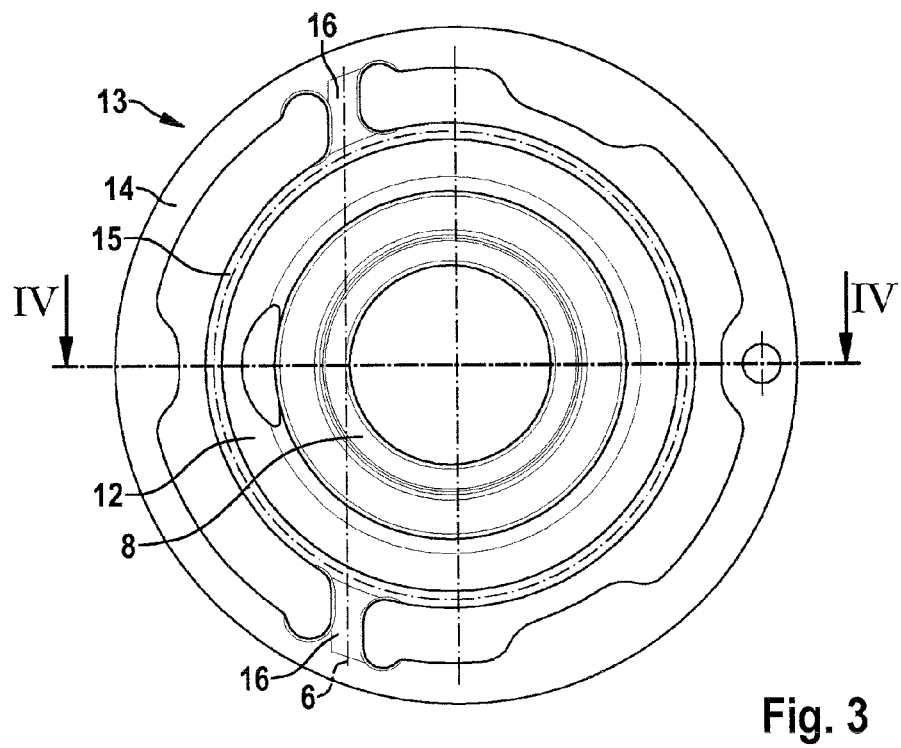
FIG. 3 shows the fixed bearing in a view from above.
Figure 4:
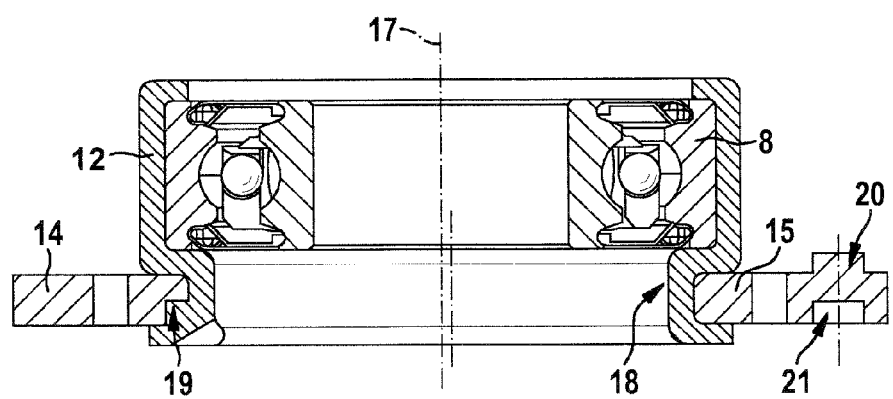
FIG. 4 shows the fixed bearing in a longitudinal section along the sectional plane IV-IV in FIG. 3.

The pivoting ring 13 comprises an outer ring 14 and an inner ring 15. The outer ring 14 is connected via two torsion webs 16 to the inner ring 15. The outer ring 14, the inner ring 15 and the torsion webs 15 are embodied in one piece from, for example, spring steel. The two torsion webs 16 run collinearly and form the pivoting axis 6 about which the outer ring 14 can pivot relative to the inner ring 15. However, the torsion webs 16 and therefore the pivoting axis 6 do not run through the center of the pivoting ring 13 and therefore of the pinion shaft cross section here but instead run radially offset with respect thereto (cf. FIG. 3). The pivoting axis 6 therefore does not intersect with the longitudinal axis 17 of the pinion shaft 3.

As a result of the radial offset of the torsion webs 15 with respect to the center of the pivoting ring 13, the pivoting axis 6 is moved into the vicinity of the outer circumference of the pinion shaft 3, as a result of which it is possible to reduce or avoid the formation of reaction torques which result or would result owing to the toothing arrangement forces, resulting during the toothed engagement of the pinion and gear wheel 2, in conjunction with the distance of the line of action of the toothing arrangement forces from the pivoting axis 6. In order to avoid reaction torques as completely as possible there is provision that the pivoting axis 6 is located within that tangential plane which is formed at the point of contact between the two pitch or rolling circles of the gear wheel 2 and pinion.

Both the inner diameter and the outer diameter of the second longitudinal section of the bearing bushing 12 are smaller than the corresponding diameters of the first longitudinal section. As a result, an annular shoulder 18 is formed with a wall section which runs precisely radially, i.e. perpendicularly, with respect to the longitudinal axis 17 of the bearing bushing 12 (or of the pinion shaft). This shoulder constitutes on the inside a first (longitudinal) stop for the roller bearing 8 and on the outside a first (longitudinal) stop for the inner ring 15 of the pivoting ring 13. In order to secure the roller bearing 8 and the pivoting ring 13 in a largely non-movable and longitudinally axial fashion in or on the bearing bushing 12, in each case a second (longitudinal) stop is additionally provided. These second stops are formed by the shaped, radially running free ends of the bearing bushing 12. The free end which lies adjacent to the roller bearing 8 is oriented running radially inward here, while the free end which is adjacent to the pivoting ring 13 is oriented running radially outward. The shaping of the free ends of the bearing bushing 12 is carried out after the roller bearing 8 is inserted therein and the pivoting ring 13 has been fitted thereon.

Anti-rotation means is provided between the inner ring 15 of the pivoting ring 13 and the bearing bushing 12. Said anti-rotation means is constructed in the form of a depression 19 in the inner ring 15 of the pivoting ring 13. Material of the bearing bushing 12 is pressed into said depression 19 during the shaping of the corresponding free end, as a result of which a positively locking connection for preventing a relative rotation between the bearing bushing 12 and the pivoting ring 13 is formed.

A nose 20 is formed on the outer ring 14 of the pivoting ring 13, and a corresponding depression 21 is formed on the opposing side. Said nose 20 and depression 21 serve for the precisely defined positioning of the pivoting ring 13 and of the bearing bushing 12 connected thereto in a non-rotatable fashion, in the housing 1. The housing 1 has for this purpose a corresponding opposing contour.

LIST OF REFERENCE NUMBERS 1 housing
2 gear wheel
3 pinion shaft
4 steering column or output shaft
5 fixed bearing
6 pivoting axis
7 floating bearing
8 roller bearing of the fixed bearing
9 roller bearing of the floating bearing
10 bearing device of the fixed bearing
11 bearing device of the floating bearing
12 bearing bushing
13 pivoting ring
14 outer ring
15 inner ring
16 torsion web
17 longitudinal axis of the bearing bushing and of the pinion shaft
18 shoulder
19 depression
20 nose
21 depression

The invention claimed is:

1. A fixed bearing for a steering gear having a rotary bearing which comprises an inner bearing shell which is provided for receiving a pinion shaft of the steering gear, and an outer bearing shell which is accommodated in a bearing bushing, said bearing bushing having a longitudinal axis defining a direction being radial with respect to said longitudinal axis, the fixed bearing further having a pivoting ring which has an outer ring and an inner ring which are pivotably connected via one or more torsion webs, wherein the outer ring is provided for supporting the fixed bearing in a housing of the steering gear, wherein the inner ring of the pivoting ring is mounted and axially secured on a radially-positioned outside of the bearing bushing.

2. The fixed bearing as claimed in claim 1, wherein the bearing bushing has a first longitudinal section and a second longitudinal section, wherein the second longitudinal section has a smaller outer diameter and inner diameter than the first longitudinal section the bearing bushing being configured to form a stop both on the outside and on the inside of the bearing bushing along a portion between the first and second longitudinal sections, wherein the rotary bearing bears on the inner stop, and the pivoting ring bears on the outer stop.

3. The fixed bearing as claimed in claim 1, wherein the bearing bushing is embodied in a tubular shape with a constant wall thickness.

4. The fixed bearing as claimed in claim 1, wherein a free end of the bearing bushing is shaped radially inward in order to form an inner collar which forms a stop for the rotary bearing.

5. The fixed bearing as claimed in claim 1, wherein a free end of the bearing bushing is shaped radially outward in order to form an outer collar which forms a stop for the pivoting ring.

6. The fixed bearing as claimed in claim 5, wherein an annular washer is arranged between the pivoting ring and the outer collar.

7. The fixed bearing as claimed in claim 5, wherein the pivoting ring has a projection and/or a depression which forms a positively locking anti-rotation means with the outer collar.

8. A steering gear having a gear wheel, a pinion which meshes therewith and a pinion shall which comprises the pinion, wherein the pinion shaft is mounted on the one side of the pinion in a fixed bearing which forms a pivoting axis for the pinion shaft which is located transversely with respect to the longitudinal axis of the pinion shaft, wherein the fixed bearing is embodied according to claim 1.

9. The fixed bearing as claimed in claim 6, wherein the annular washer has a projection and/or a depression which form a positively locking anti-rotation means with the outer collar.

10. The fixed bearing of claim 1, wherein the bearing bushing comprises a radially-extending section which abuts the outer bearing shell in a first axial direction of the bearing bushing and abuts the inner ring in a second axial direction opposite the first axial direction.

11. The fixed bearing of claim 10, wherein the bearing bushing is configured so that the radially-extending section is a first longitudinal stop for the outer bearing shell and is a first longitudinal stop for the inner ring.

12. The fixed bearing of claim 11, wherein the bearing bushing further comprises a second radially-extending section and is configured so that the second radially-extending section is a second longitudinal stop for the inner ring.

13. The fixed bearing of claim 12, wherein the bearing bushing has a non-slotted tubular shape and wherein said first radially-extending section and said second radially-extending section comprise a circumferentially-extending collar for the inner ring.

\* \* \* \* \*